`(12)` United States Patent
Le Van Suu

`(10)` Patent No.: US 6,321,324 B1
`(45)` Date of Patent: *Nov. 20, 2001

`(54)` DEVICE FOR PUTTING AN INTEGRATED CIRCUIT INTO OPERATION

`(75)` Inventor: Maurice Le Van Suu, Romainville (FR)

`(73)` Assignee: SGS-Thomson Microelectronics S.A., Gentilly (FR)

`(*)` Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

`(21)` Appl. No.: 09/371,773

`(22)` Filed: Aug. 10, 1999

Related U.S. Application Data

`(63)` Continuation of application No. 08/636,634, filed on Apr. 23, 1996, now Pat. No. 6,035,385.

`(30)` Foreign Application Priority Data

Apr. 28, 1995 (FR) .................................................. 95 05177

`(51)` Int. Cl.$^7$ ...................................................... G06F 15/16
`(52)` U.S. Cl. ................................................. 712/34; 706/1
`(58)` Field of Search .................................. 712/34; 706/1

`(56)` References Cited

U.S. PATENT DOCUMENTS

| | | |
|---|---|---|
| 4,720,812 | 1/1988 | Kao et al. ............................ 395/652 |
| 4,837,735 | 6/1989 | Allen, Jr. et al. ...................... 706/10 |
| 5,361,371 | 11/1994 | Kawamoto et al. .................. 395/800 |
| 5,410,721 | 4/1995 | Divine et al. ........................ 395/595 |
| 5,600,757 | 2/1997 | Yamamoto et al. ..................... 706/1 |
| 5,706,478 | 1/1998 | Dye ..................................... 395/503 |
| 6,035,385 | * 3/2000 | Le Van Suu .......................... 712/34 |

FOREIGN PATENT DOCUMENTS

| | | | |
|---|---|---|---|
| A-42 25 758 | 2/1996 | (DE) | ............................... G06F/15/20 |
| A-0 364 743 | 4/1990 | (EP) | ................................. G06F/9/24 |
| A-0 455 345 | 11/1991 | (EP) | ................................. G06F/9/38 |

OTHER PUBLICATIONS

French Search Report from French Patent Application No. 95 05177, filed Apr. 28, 1995.

Electronic Engineering, vol. 65, No. 795, Mar. 1, 1993, p. 83 "Combining Fuzzy Hard–Ware With the Arm Core".

Kourra et al., "Dedicated Silicon Solutions for Fuzzy Logic Systems," IEE London, UK pp 3/1–3/12, 5/93.

Ikeda et al., "A Fuzzy Inference Coprocessor Using a Flexible Active–Rule–Driven Architecture," IEEE pp 537–544, Mar. 8, 1992.

\* cited by examiner

Primary Examiner—John A. Follansbee
(74) Attorney, Agent, or Firm—Wolf, Greenfield & Sacks, P.C.; James H. Morris

`(57)` ABSTRACT

To enable the putting into use of a monolithic integrated circuit comprising a processor and a fuzzy logic coprocessor, both having a single program memory in common, an operation is effected by which, at the time of the initializing of the integrated circuit, a volatile, random-access memory of the coprocessor is loaded with instructions stored in this single program memory.

28 Claims, 3 Drawing Sheets

DEVICE FOR PUTTING AN INTEGRATED CIRCUIT INTO OPERATION

CROSS REFERENCE TO RELATED APPLICATIONS

This application is a continuation of application Ser. No. 08/636,634, filed Apr. 23, 1996, entitled A CIRCUIT FOR LOADING A MEMORY WITH RULES FOR A FUZZY LOGIC MICROPROCESSOR UPON START-UP OF THE CIRCUIT, which prior application is incorporated herein by reference, now U.S. Pat. No. 6,035,385.

BACKGROUND OF THE INVENTION

1. Field of the Invention

The invention relates to a device for the putting into use of an integrated circuit, especially an integrated circuit provided with a logic processor and a fuzzy logic coprocessor. The invention is aimed in fact at enabling the making of an integrated circuit of this kind that would comprise, on one and the same circuit, a single chip that is both the processor and the fuzzy logic coprocessor.

2. Discussion of the Related Art

There are known integrated circuits provided with a processor. These circuits normally include the input/output means of the integrated circuit, the processor itself constituted for example by a set of logic gates), a program memory, working registers and, possibly, associated non-volatile type memories, namely EPROMS or EEPROMs or else FLASH EPROMs. A fuzzy logic processor corresponds to the same definition and includes the same elements.

The value of fuzzy logic processors lies in the specific characteristics of this technique. Normally, to be able to manage a phenomenon, it is necessary, in a program comprising a main program as well as a set of sub-programs, to have foreseen and organized all the steps to be performed in the light of the quantity of information elements that may be received on the state of the system. A program of this kind is generally demanding in terms of memory bytes to be stored in the program memory of the integrated circuit. For example, to manage a suction hood system with three inputs and one output, for a standard logic processor, it is necessary to have available twelve kilobytes in the program memory in order to store the corresponding program. It can be shown that in fuzzy logic, with a sufficiently precise approach, this management task could require only the recording of thirty-two rules taking up less than 500 bytes in a programme memory of the fuzzy logic processor. Consequently, the combination of a logic processor and a fuzzy logic processor on one and the same integrated circuit is quite worthwhile because, without necessitating a large additional memory, it enables the integration of a particularly efficient function (namely the fuzzy logic function).

However, this association proves to be impracticable in reality. There is a problem of cohabitation between the program memory of the logic processor and the program memory of the fuzzy logic processor. Indeed, in a circuit of the type sold to professionals, it is necessary to plan for a program memory of the fuzzy logic processor that could contain a large number of rules in order to manage a complex phenomenon, given that there is no a priori knowledge of what the user will do with it. Consequently, it is necessary in this case to provide the fuzzy logic processor with a large memory. The same situation applies in regard to the memory of the standard processor: it too must be large.

This means that it is necessary then to make an integrated circuit with two large memory arrays. This cannot be done at low cost. Nor it is possible to use the approach in which a single memory is made and shared between the needs of the logic processor and those of the fuzzy logic processor, for the address buses, the data buses and the control buses of the two processors are not structured in the same way. Indeed, an integrated circuit comprising a processor is represented, for its manufacture, by drawings and masks whose definition is linked furthermore to the operating protocol of this logic processor. This is also the case with a fuzzy logic processor. These drawings and masks are based on different designs and cannot truly be associated with each other. However, this is what is sought to be done in order to avoid having to entirely re-design a processor provided with a fuzzy logic coprocessor.

SUMMARY OF THE INVENTION

In the invention, the difficulty is circumvented by storing the programs of the logic processor and of the fuzzy logic processor in one and the same program memory, and by prompting the loading of a volatile random-access memory (RAM) of the fuzzy logic processor by means of the program of this fuzzy logic processor when the integrated circuit is started up. In other words, in the invention, a problem of space in the integrated circuit is resolved by deferring the action of putting each of the components of this integrated circuit into use.

In view of the fact that the starting up does not take place often, i.e. once a day for a heating installation and once an hour for a suction hood, and given the speed with which the initialization will take place (in a period of time equal to or smaller than one second), it is easy to reach the desired goal which is to combine two different types of circuit on one and the same monolithic integrated circuit.

Therefore, an object of the invention therefore is a device for putting into use an integrated circuit that comprises a program memory, a first logic processor and a fuzzy logic coprocessor, wherein said device comprises a volatile random-access memory linked with this coprocessor to store instructions from this coprocessor, a circuit for loading of this random-access memory, this loading circuit comprising means to prompt this loading when the integrated circuit is put into use.

BRIEF DESCRIPTION OF THE DRAWINGS

The invention will be understood more clearly from the following description and from the accompanying figures. These figures are given purely by way of an indication and in no way restrict the scope of the invention. In these figures.

DETAILED DESCRIPTION

Figure 1:
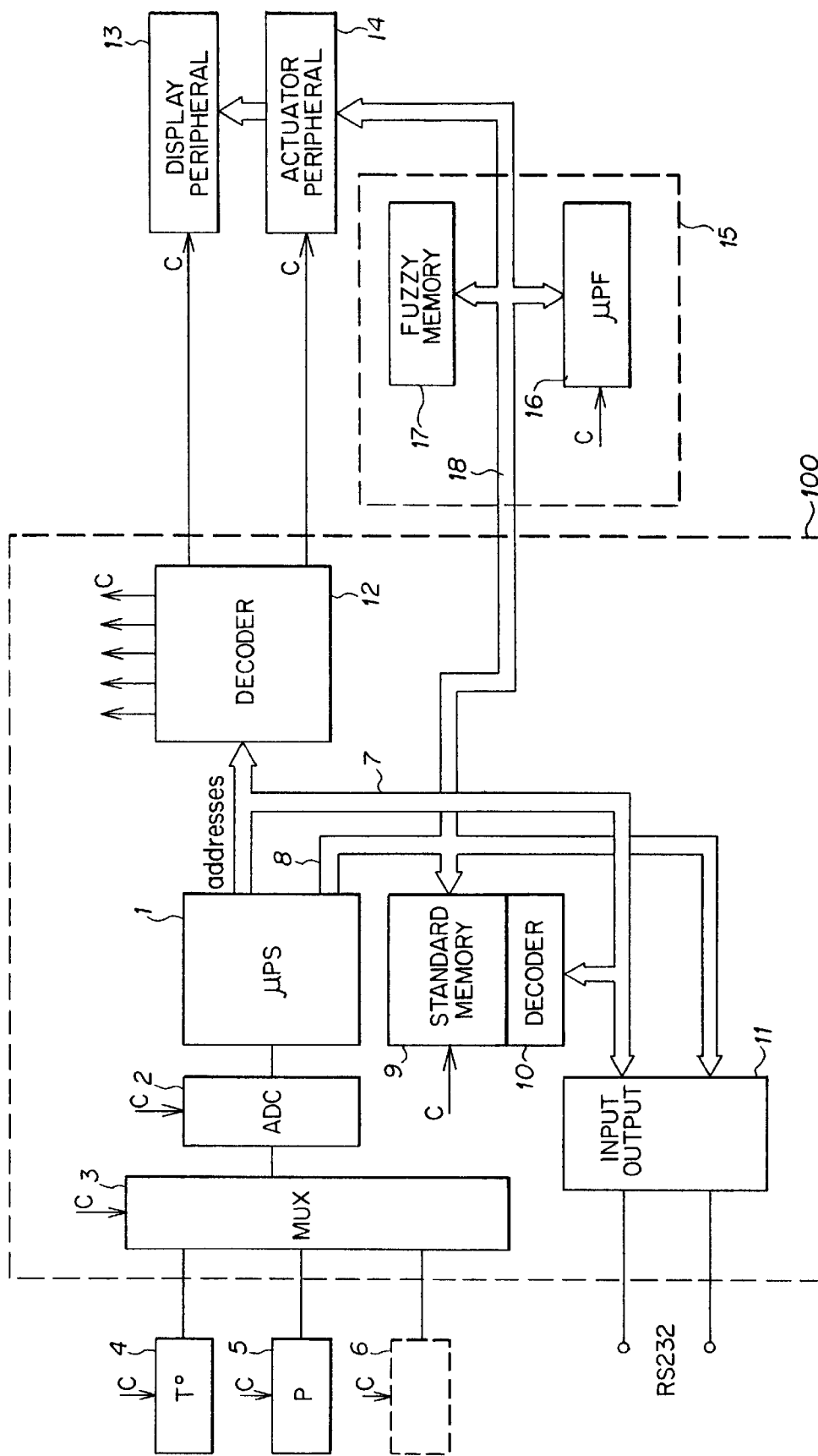
FIG. 1 is a schematic view of a system of the prior art in which the logic processor and the fuzzy logic processor are made on different integrated circuits.

FIG. 1 illustrates, according to the prior art, a first integrated circuit with a standard logic processor 1 linked, by means of an analog-digital converter 2 and a multiplexer with a set of sensors 4 to 6 measuring, for example, the temperature T° or the pressure P. The processor 1 has an address bus 7 and a data bus 8 by which it can access a memory 9, comprising notably the program of the logic processor, by means of a decoder 10. It may also access an input/output circuit 11 enabling exchanges of signals with the outside world, in particular according to a series type protocol known as the RS232 protocol. The same integrated circuit also has a decoder 12 producing control signals C. The control signals are applied to various elements of the integrated circuit and also, as the case may be, to the sensors 4 to 6 or to other circuits.

The integrated circuit 100 described is linked with peripherals, especially a peripheral display circuit 13 and a peripheral actuator circuit 14. The processor 1 is entrusted with the current management of the system. For example, it prompts the regular scanning of the sensors and the regular dispatch of information elements to the display unit or to the actuator.

The information elements delivered by the sensors have to be processed swiftly. In the prior art, there is a growing trend towards the use of fuzzy logic processors, as indicated, in a second integrated circuit 15 linked with the first one. This second integrated circuit 15 is a fuzzy logic coprocessor comprising the processor 16 itself as an arithmetic and logic unit and a program memory 17. The circuit 15 essentially has a link acting as a data bus 18 between its memory 17 and its processor circuit 16. The link 18 is naturally connected with the data bus 8.

The working of a prior art system such as this includes, at initialization of the processor 1, scanning of the sensors 4 to 5, conveying of the measurement data elements picked up in these sensors by the bus 8 to the coprocessor 16, processing in the circuit 16 of these information elements and their restitution on the bus 18 in the form of data elements which, additionally, are transmitted to the display unit 13 or to the actuator 14. The processor 16 also has a control input so that it can be put into use at the initialization of the processor 1 by means of commands coming from the decoder 12.

The problem resolved by the invention is that of the cohabitation, on one and the same integrated circuit, of memories 9 and 17 whose management is different. Indeed, if it is desired that these two memories should be powerful, an excessively large integrated circuit is obtained. If their contents have to be put into a single physical memory, it must also be left to the designer to manage the memory space. The matter then becomes too complicated for the designer. If a limit is set in the common memory space, then the system obtained will be excessively rigid and will not be suited to a variety of uses.

Figure 2:
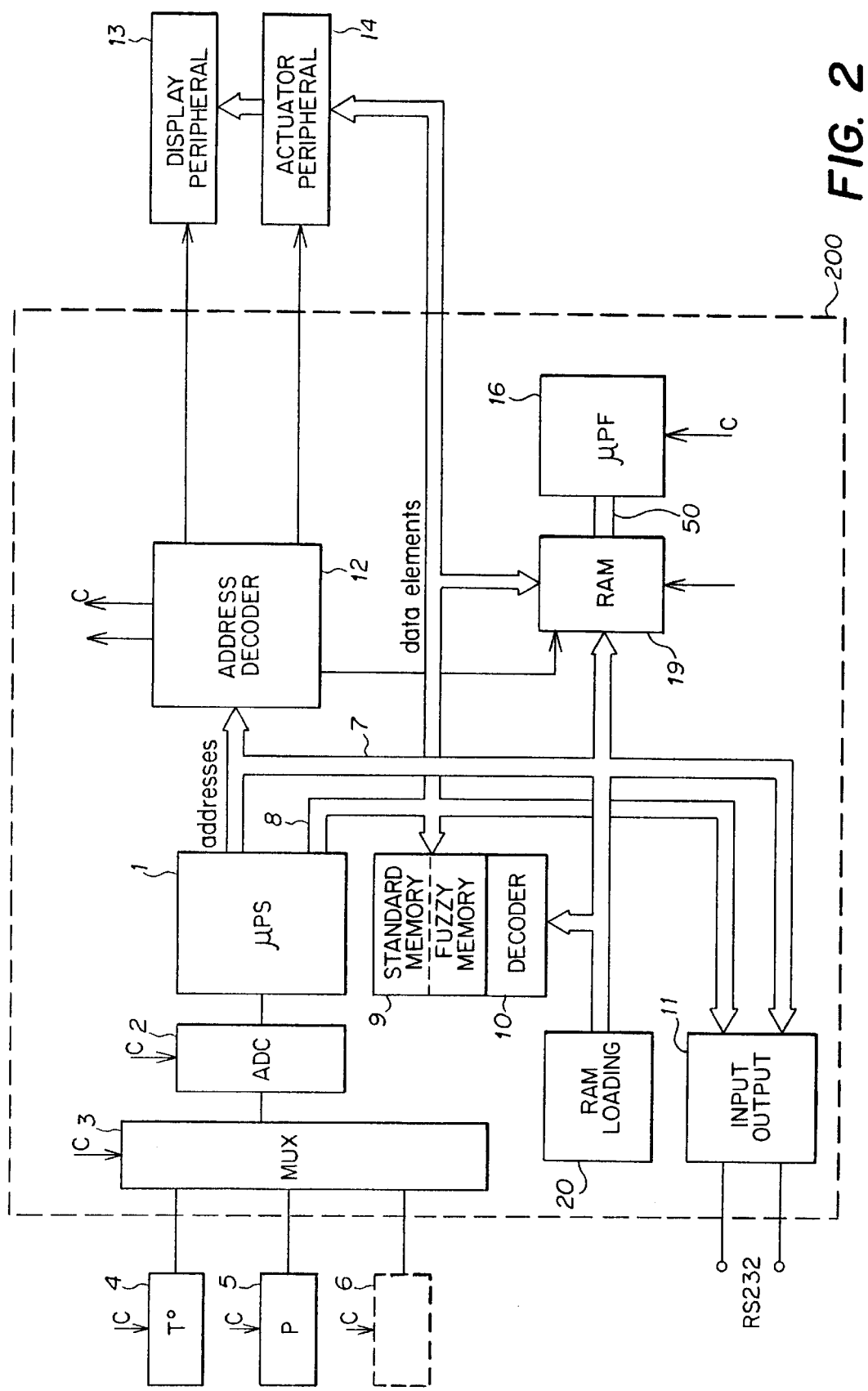
FIG. 2 shows the same elements as those of FIG. 1. but modified according to the invention to enable the construction of a single integrated circuit.

FIG. 2 repeats the same elements as those of FIG. 1 but, in addition, incorporates the special features of the invention. The concerned integrated circuit 200 has a logic processor I and a fuzzy logic coprocessor 16. It also has a program memory 9. A feature of the invention is the fact that the fuzzy logic coprocessor now has a volatile random-access memory 19 instead of the fuzzy memory 17 which was naturally a non-volatile memory in order to be able to contain the instructions to be carried out. The memory 19 is linked with the coprocessor 16 by a set of connections 50. It contains the rules, the instructions, of this coprocessor. Another feature of the invention is the fact that it comprises a loading circuit 20 that enables loading, when the circuit 200 is started up (initialized), of the memory 19. In a preferred exemplary embodiment which shall be described hereinafter, when the system is started up, loading is done from the contents of the memory 9. However, it is also possible to envisage an arrangement where the memory 19 is loaded from the input/output circuit 11 with information elements coming from the outside world to which the circuit of FIG. 2 would be connected by its circuit 11, in particular according to an RS232 type protocol. This, additionally, is the object of another patent application filed on even date entitled Method For Putting An Integrated Circuit Into Operation, which in incorporated herein be reference.

The principle is the following. At the time of starting up, the processor 1 which normally comprises a power-on reset (POR) circuit does not come into use unless its elements are all electrically configured in the right way. In the invention, it has been planned that, during the step of initialization of the integrated circuit, the loading circuit 20 will prompt the loading, into the memory 19, of the instructions of the coprocessor 16.

Figure 3:
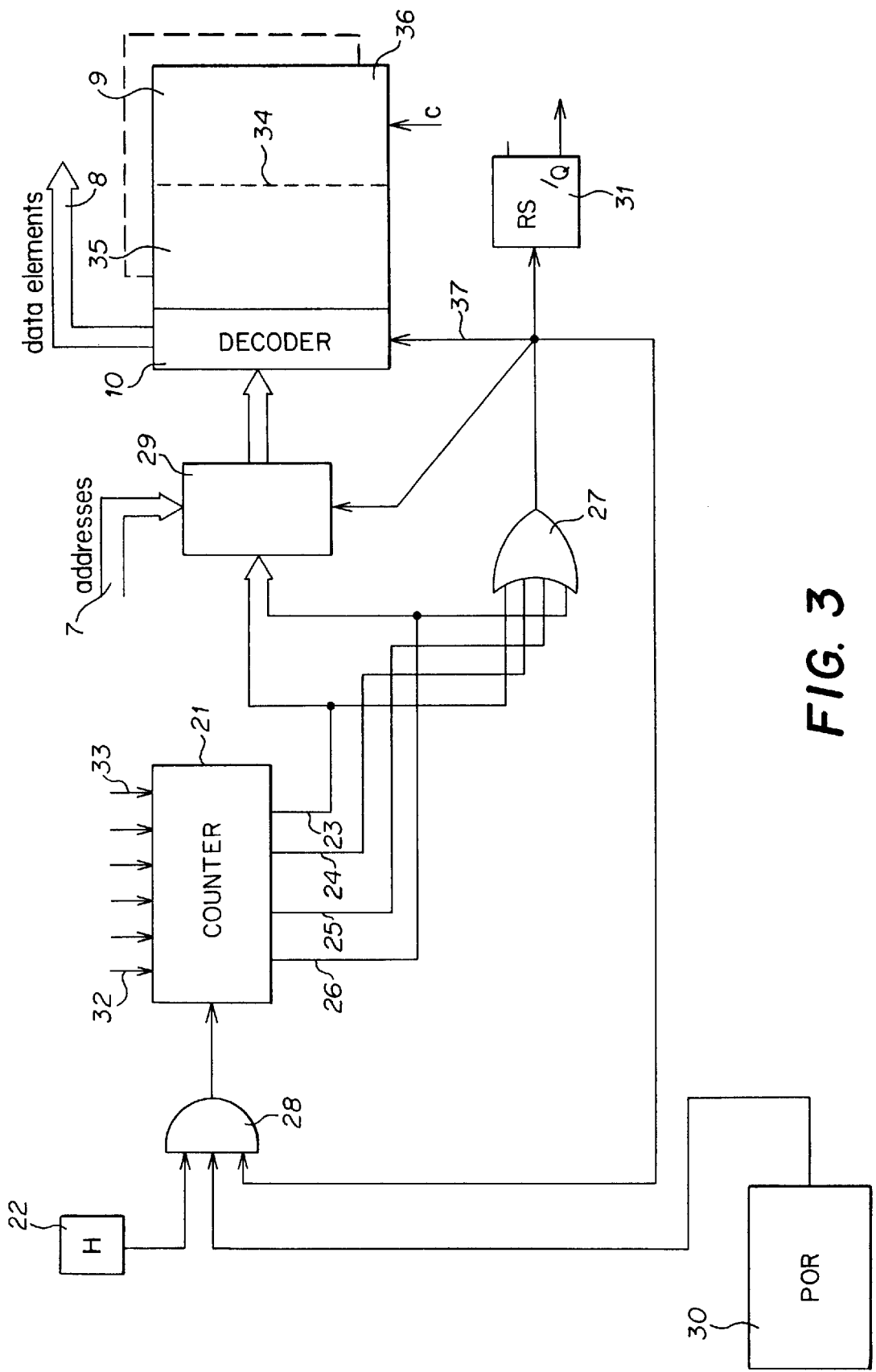
FIG. 3 shows an exemplary embodiment of a detail of the device according to the invention for putting an integrated circuit into use.

FIG. 3 shows an example of the way in which this may happen. The circuit 20 has a counter 21 receiving a clock signal from a clock 22 which, additionally, may be the clock of the processor 1 or even an external clock. The counter 21, at the time of starting up, is placed in a given state. At its outputs, for example 23 to 26, it then delivers an electrical state representing its initial counting state. This counting state is used as an address. To this end, the outputs 23 to 26 are connected to the decoder 10 of the memory 9 and enable the addressing of the memory words of this memory 9. At each cycle of the clock 22, the memory 9 also receives a command C from the decoder 12 for the reading of its contents located at the address represented by the signals available on the wires 23 to 26. The contents of the memory thus read are transmitted on the wires of the data bus 8. Hereinafter, we shall see the way in which the data elements thus extracted from the memory 9 are recorded in the memory 19.

At the next cycle, the counter that receives the clock signal at its counting input modifies its counting state: namely it indicates another address. Continuing in this fashion, each of the words of the memory 9 addressed is sent on the bus 8. It shall be assumed, for simplification of explanation, that the counter 21 is a forward-backward counter or reversible counter.

The wires 23 to 26 of the counter are also connected to the inputs of an OR logic gate 27. The OR gate 27 delivers an output signal which is at 1 so long as at least one of the signals on any of the wires 23 to 26 is in the state 1. When the counter reaches the state 000 . . . 00, the gate 27 delivers a state 0.

This state 0 is then used for several purposes. First, it is used to stop the counting in the counter 21. To this end, the output of the gate 27 is connected to an input of an AND gate 28 that also receives the clock signal from the clock 22. In this way, the AND gate 28, whose output is connected to the counting input of the counter 21, permits the counter 21 to count the pulses of the clock 22 only so long as the output of the gate 27 is not at 0. As soon as it is at 0, the counting stops. The output of the gate 27 is also connected as a control input of a multiplexer 29 which, at the input of the decoder 10, organizes the multiplexing of the wires 23 to 26 with the address wires of the bus 7 coming from the processor 1. At the outset, when the output of the gate 27 is at 1, the electrical states available at the outputs 23 to 26 are applied to the decoder 10. The states of the address buses 7 are not taken into account. When the initial reading of the memory 9 is ended, the running of the counter 21 is stopped and the multiplexer 29 is switched over by the output of the gate 27 and normally enables the addressing of the memory 9 by the address bus 7.

For loading of the RAM 19, the processor 1 delivers a series of addresses that are applied naturally to the inputs of addresses of the memory 19 by the bus 7. This series of addresses is, for example, produced by another counter of the same type as the counter 21 contained in the processor 1 and connected at its output to the wires of the bus 7. In the meantime, the data elements for their part are available on the bus 7 as has been seen further above. During this initial period, with the decoder 12, the processor 1 also delivers a command for the writing, in the memory 19, of the data elements available on the bus 8 at the addresses dictated by the bus 7.

At the end of the initial period, the memory 19 is loaded with the instructions and rules that can be used by the fuzzy logic processor 16. This is exactly what was desired.

FIG. 3 also shows a prior art POR type circuit 30 for putting an integrated circuit into use. In the invention, the output of the POR circuit 30 will also be introduced to an additional input of the AND gate 28 so as to permit the starting up of the loading circuit of the memory 19 only if the integrated circuit is in working order. FIG. 3 also shows an RS flip-flop circuit 31 that receives the signal introduced by the OR gate 27 and delivers, at its /Q output, a signal capable of being used for the definitive purpose of initializing the integrated circuit of FIG. 2.

In a preferred example, the counter 21 has setting inputs 32 to 33 at which, before the signal delivered by the circuit 30 becomes active, the processor 1 sets up electrical states enabling the counter 21 to be put into a chosen state of countdown. For there is a known standard way of dictating the state of certain counters so as to obtain a chosen state. This preferred approach has the advantage of enabling the designer himself to make a choice, in the memory 9, of the boundary 34 between the zones 35 and 36 of this memory in which there are respectively stored the instructions of the fuzzy logic processor (to be loaded at the time of starting up) and the instructions of the processor 1. To this end, the memory 9 will preferably be an EEPROM type memory that is programmable and rasable. The part 35 is understood to be a part comprising the contiguous memory zones, namely contiguous in the sense that they are successively addressed by the signals available at the outputs 23 to 26 of the counter 21.

In order that the random-access memory 19 may no longer be accessed after the initial period, it can be seen to it that the bus 7 will permit access to this memory 19 only through a multiplexer of the same type as the multiplexer 19, which is furthermore controlled by the signal coming from the gate 27. For example, after starting up, the bus 7 is no longer linked with the memory 19. This memory 19 will be linked solely with the processor 16 by the bus 50.

It is also possible to provide for another architecture of the memory 9. In one example, this memory has only one decoder (which normally takes up a lot of space) and two memory pages. A first memory page of the memory 9 is put into use so long as it receives the signal delivered by the gate 27 in the active state. The other memory page is put into use when it receives this same signal in the inactive state. This is shown schematically in FIG. 3 where the output from the gate 27 comes into the decoder 10 as a complementary decoding input 36 enabling one memory to be distinguished from the other. In this approach, as compared with the approach shown in FIG. 1, there is a gain inasmuch as there is only one decoder 10 for two memory pages. The second memory page is shown in dashes behind the memory page 9.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A device for putting into operation an integrated circuit that comprises a program memory, a first logic processor and a fuzzy logic coprocessor, said device comprising:

a volatile random-access memory linked with the coprocessor to store rules for the fuzzy logic coprocessor, and a loading circuit for loading of the volatile random-access memory, the loading circuit comprising means to prompt loading when the integrated circuit is put into operation;

wherein the program memory comprises at least one duplicated part and, in an associated decoder, an additional decoding access to decode a signal produced by a counter in order to access the duplicated part of the program memory;

wherein said loading circuit includes at least one of, a) means for loading the random-access memory from the contents of the program memory; and b) means for loading the random-access memory from an input/output circuit.

2. A device according to claim 1, wherein the loading circuit comprises a forward-backward backward counter controlled by a clock to produce addresses, in the program memory of the integrated circuit, of memory words of the program memory to be loaded into the random-access memory of the coprocessor.

3. A device according to claim 1 further including logic means having active and inactive states defining two distinct modes of operation having inputs coupled from said counter outputs and having an output coupled to and for controlling the state of said decoder.

4. A device according to claim 3 including a multiplexer having a first input connected to an address bus and a second input receiving counter addressing signals.

5. A device according to claim 1 including a multiplexer having a first input connected to an address bus and a second input receiving counter addressing signals.

6. A device for putting into operation an integrated circuit that comprises a program memory, a first logic processor and a fuzzy logic coprocessor, said device comprising:

a volatile random-access memory linked with the coprocessor to store rules for the fuzzy logic coprocessor, and a loading circuit for loading of the volatile random-access memory, the loading circuit comprising means to prompt loading when the integrated circuit is put into operation;

wherein the program memory comprises at least one duplicated part and, in an associated decoder, an additional decoding access to decode a signal produced by a counter in order to access the duplicated part of the program memory;

wherein said loading circuit includes at least one of, a) means for loading the random-access memory from the contents of the program memory; and b) means for loading the random-access memory from an input/output circuit;

wherein the loading circuit comprises a forward-backward counter controlled by a clock to produce addresses, in the program memory of the integrated circuit, of memory words of the program memory to be loaded into the random-access memory of the coprocessor;

wherein the forward-backward counter comprises means to be configured with an initial value, at the time when the integrated circuit is put into use, before performing a countdown operation.

7. A device according to claim 6 wherein said means to be configured comprises a power-on-reset circuit.

8. A device according to claim 6 further including logic means having active and inactive states defining two distinct modes of operation having inputs coupled from said counter outputs and having an output coupled to and for controlling the state of said decoder.

9. A device for putting into operation an integrated circuit that comprises a program memory, a first logic processor and a fuzzy logic coprocessor, the device comprising:

a volatile random-access memory linked with the fuzzy logic coprocessor to store rules for the fuzzy logic coprocessor;

a loading circuit for loading of the random-access memory, the loading circuit comprising means to prompt loading when the integrated circuit is put into operation, and an address bus for connection of the program memory to the logic processor, the loading circuit comprising a multiplexer having a first input connected to the address bus, and a second input receiving addressing signals produced in this loading circuit.

10. A device according to claim 9, wherein the loading circuit comprises a forward-backward counter controlled by a clock to produce addresses, in the program memory of the integrated circuit, of memory words of the program memory to be loaded into the random-access memory of the coprocessor.

11. A device for putting into operation an integrated circuit that comprises a program memory, a first logic processor and a fuzzy logic coprocessor, the device comprising:

a volatile random-access memory linked with the fuzzy logic coprocessor to store rules for the fuzzy logic coprocessor;

a loading circuit for loading of the random-access memory, the loading circuit comprising means to prompt loading when the integrated circuit is put into operation, and an address bus for connection of the program memory to the logic processor, the loading circuit comprising a multiplexer having a first input connected to the address bus, and a second input receiving addressing signals produced in this loading circuit;

wherein the loading circuit comprises a forward-backward counter controlled by a clock to produce addresses, in the program memory of the integrated circuit, of memory words of the program memory to be loaded into the random-access memory of the coprocessor;

wherein the forward-backward counter comprises means to be configured with an initial value, at the time when the integrated circuit is put into use, before performing a countdown operation.

12. A device according to claim 11 wherein said means to be configured comprises a power-on-reset circuit.

13. A circuit for operating an integrated circuit comprising:

a microprocessor;

a fuzzy logic microprocessor;

a program memory associated with the microprocessor;

a random-access memory associated with the fuzzy logic microprocessor for storing rules for use by the fuzzy logic microprocessor;

an address bus for interconnection of the program memory, microprocessor, and random-access memory;

a loading circuit comprising means for only initiating loading of the random-access memory when the integrated circuit is put into operation.

14. The circuit of claim 13 including a decoder associated with the program memory also receiving the address bus.

15. The circuit of claim 14 including a data bus, said microprocessor, said program memory and said random access memory all being connected to said data bus.

16. The circuit of claim 15 wherein the rules to be loaded into said random-access memory are able to be communicated, under control of said loading circuit, from said program memory to said random-access memory over said data bus.

17. The circuit of claim 16 wherein said program memory comprises at least one duplicated part.

18. The circuit of claim 17 wherein said loading circuit comprises a counter for providing an addressing signal for coupling to said decoder.

19. The circuit of claim 18 wherein said counter comprises a bi-directional counter controlled by a clock to produce the addressing signals of the program memory to be loaded in the random-access memory.

20. The circuit of claim 19 wherein the counter includes means to be configured with an initial value, at the time when the integrated circuit is put into use, before performing a countdown operation.

21. The circuit of claim 13 wherein said loading circuit includes at least one of, a) means for loading, a) means for loading the random-access memory from the contents of the program memory; and b) means for loading the random-access memory from an input/output circuit.

22. The circuit of claim 13 including a decoder associated with the program memory also receiving the address bus and a counter for providing an addressing signal for coupling to said decoder, and further including means to be configured comprises a power-on-reset circuit.

23. The circuit of claim 13 including a decoder associated with the program memory also receiving the address bus and a counter for providing an addressing signal for coupling to said decoder;

wherein the counter includes means to be configured with an initial value, at the time when the integrated circuit is put into use, before performing a countdown operation; and wherein the means to be configured comprise a power-on-reset circuit.

24. A circuit for operating an integrated circuit comprising:

a microprocessor;

a fuzzy logic microprocessor;

a program memory associated with the microprocessor;

a random-access memory associated with the fuzzy logic microprocessor for storing rules for use by the fuzzy logic microprocessor;

an address bus for interconnection of the program memory, microprocessor, and random-access memory;

a loading circuit comprising means for only initiating loading of the random-access memory when the integrated circuit is put into operation;

including a decoder associated with the program memory also receiving the address bus;

including a data bus, said microprocessor, said program memory and said random access memory all being connected to said data bus;

wherein the rules to be loaded into said random-access memory are able to be communicated, under control of said loading circuit, from said program memory to said random-access memory over said data bus;

wherein said program memory comprises at least one duplicated part;

wherein said loading circuit comprises a counter for providing an addressing signal for coupling to said decoder;

wherein said counter comprises a bi-directional counter controlled by a clock to produce the addressing signals of the program memory to be loaded in the random-access memory;

wherein the counter includes means to be configured with an initial value, at the time when the integrated circuit is put into use, before performing a countdown operation;

wherein the means to be configured comprise a power-on-reset circuit.

25. The circuit of claim 24 including a multiplexer having a first input connected to the address bus and a second input receiving the counter addressing signals.

26. A circuit for operating an integrated circuit comprising:

a microprocessor;

a fuzzy logic microprocessor;

a program memory associated with the microprocessor;

a random-access memory associated with the fuzzy logic microprocessor for storing rules for use by the fuzzy logic microprocessor;

an address bus for interconnection of the program memory, microprocessor, and random-access memory;

a loading circuit comprising means for only initiating loading of the random-access memory when the integrated circuit is put into operation;

including a decoder associated with the program memory also receiving the address bus;

including a data bus, said microprocessor, said program memory and said random access memory all being connected to said data bus;

wherein the rules to be loaded into said random-access memory are able to be communicated, under control of said loading circuit, from said program memory to said random-access memory over said data bus;

wherein said loading circuit comprises a counter for providing an addressing signal for coupling to said decoder;

wherein the counter includes means to be configured with an initial value, at the time when the integrated circuit is put into use, before performing a countdown operation; and wherein the means to be configured comprise a power-on-reset circuit.

27. The circuit of claim 26 including a multiplexer having a first input connected to the address bus and a second input receiving the counter addressing signals.

28. A circuit for operating an integrated circuit comprising:

a microprocessor;

a fuzzy logic microprocessor;

a program memory associated with the microprocessor;

a random-access memory associated with the fuzzy logic microprocessor for storing rules for use by the fuzzy logic microprocessor;

an address bus for interconnection of the program memory, microprocessor, and random-access memory;

a loading circuit comprising means for only initiating loading of the random-access memory when the integrated circuit is put into operation.

including a decoder associated with the program memory also receiving the address bus;

including a data bus, said microprocessor, said program memory and said random-access memory all being connected to said data bus;

wherein the rules to be loaded into said random-access memory are able to be communicated, under control of said loading circuit, from said program memory to said random-access memory over said data bus;

wherein said loading circuit comprises a counter for providing an addressing signal for coupling to said decoder; and including a multiplexer having a first input connected to the address bus and a second input receiving the counter addressing signals.

* * * * *